United States Patent [19]

Sanderson et al.

[11] Patent Number: 5,012,912

[45] Date of Patent: May 7, 1991

[54] SAFETY INTERLOCK/LATCH ASSEMBLY FOR A PRINTING PRESS

[75] Inventors: Harold Sanderson, Glen Ellyn; Larry J. Vande Walle, Hinsdale, both of Ill.

[73] Assignee: Rockwell International Corporation, El Segundo, Calif.

[21] Appl. No.: 485,017

[22] Filed: Feb. 26, 1990

[51] Int. Cl.⁵ .............................................. F16P 3/08
[52] U.S. Cl. ................................... 192/133; 192/129 R; 200/334; 200/573; 100/53
[58] Field of Search ............... 192/129 A, 129 R, 130, 192/133, 135; 200/332, 334, 335, 337, 573; 100/53

[56] References Cited

U.S. PATENT DOCUMENTS

| | | | |
|---|---|---|---|
| 1,491,810 | 4/1924 | Marquart | 192/133 |
| 1,609,909 | 12/1926 | Lewis | 192/133 |
| 2,013,248 | 9/1935 | Nelson | 192/129 A |
| 2,555,346 | 6/1951 | Larsen | 192/133 |
| 2,794,528 | 6/1957 | King | 192/135 |
| 2,818,149 | 12/1957 | Martell | 142/130 |
| 3,300,009 | 1/1967 | Hess | 192/130 |
| 3,345,490 | 9/1967 | Gerjets et al. | 200/337 |
| 3,805,658 | 4/1974 | Scott et al. | 192/135 |
| 3,817,363 | 6/1974 | Wigington, Jr. | 192/135 |
| 3,902,582 | 9/1975 | Cross | 192/135 |
| 4,036,343 | 7/1977 | McPhee | 192/130 |
| 4,162,878 | 7/1979 | Puglisi et al. | 100/53 |
| 4,228,884 | 10/1986 | Michels | 192/135 |
| 4,291,207 | 9/1981 | Reinke et al. | 200/332 |

FOREIGN PATENT DOCUMENTS 625059  9/1961  Italy ........................... 200/332

Primary Examiner—Rodney H. Bonick
Assistant Examiner—Nicholas Whitelaw
Attorney, Agent, or Firm—Patti, C. B.; V. L. Sewell; H. F. Hamann

[57] ABSTRACT

A safety interlock/latch assembly for use on a printing press having at least one safety latch (100) and one guard element (102). At least one lockable pivot device (106, 116) for allowing rotation of the guard element (102) is attached to a first end (104) of the guard element (102). A roller (112) for engaging the lockable pivot device (106, 116) is provided and has a cam (146) for switch actuation. A support device (132) for rotatably holding the roller (112) is provided and has an aperture (142) with a predetermined configuration for receiving the lockable pivot device (106, 116). The support device (132) is located at least between the lockable pivot device (106, 116) and the roller (112) and is attached to the printing press. A release latch (160) on the support device (132) holds the guard element (102) open and a spring latch (158) on the support device (132) holds the guard element (102) closed.

20 Claims, 6 Drawing Sheets

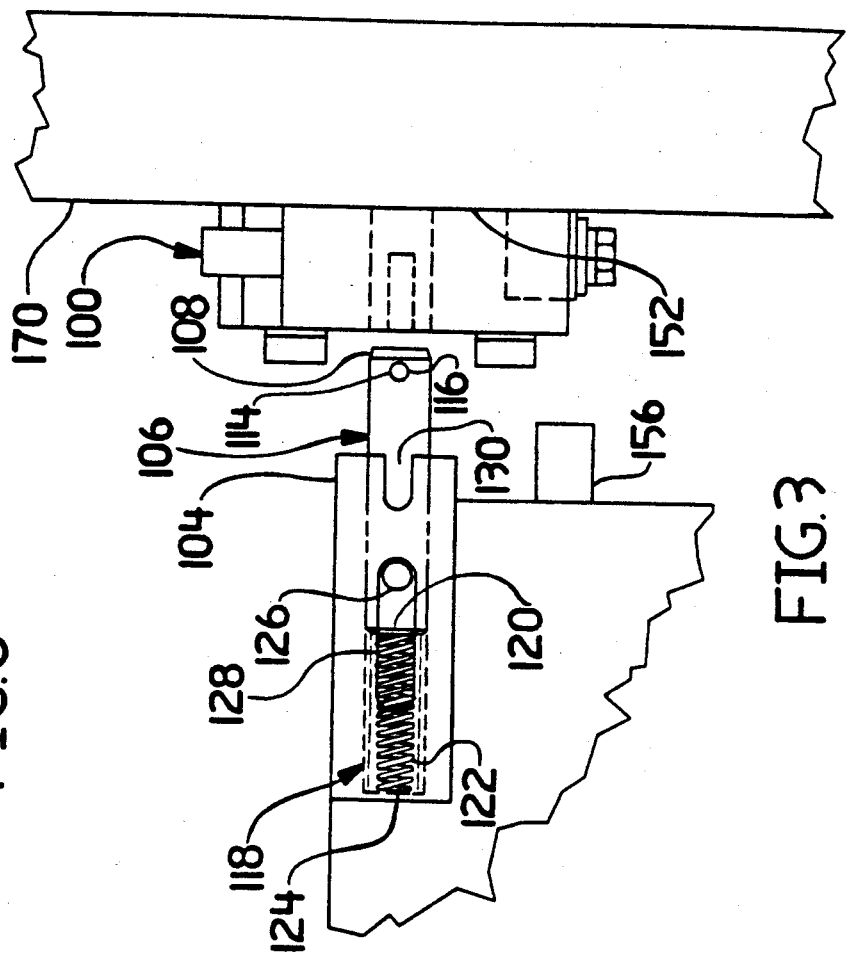
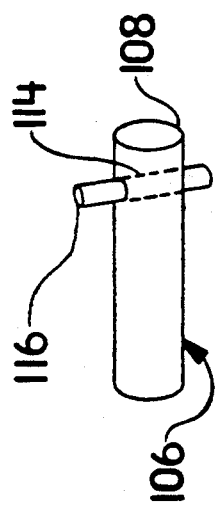
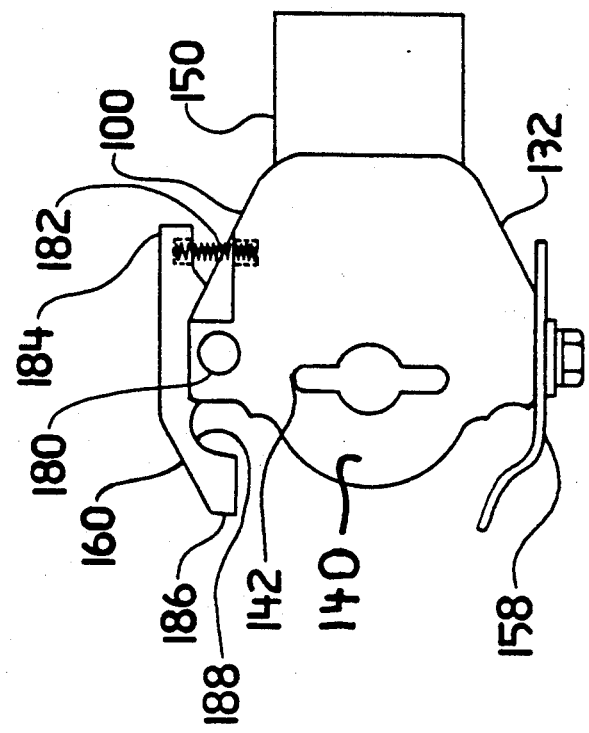

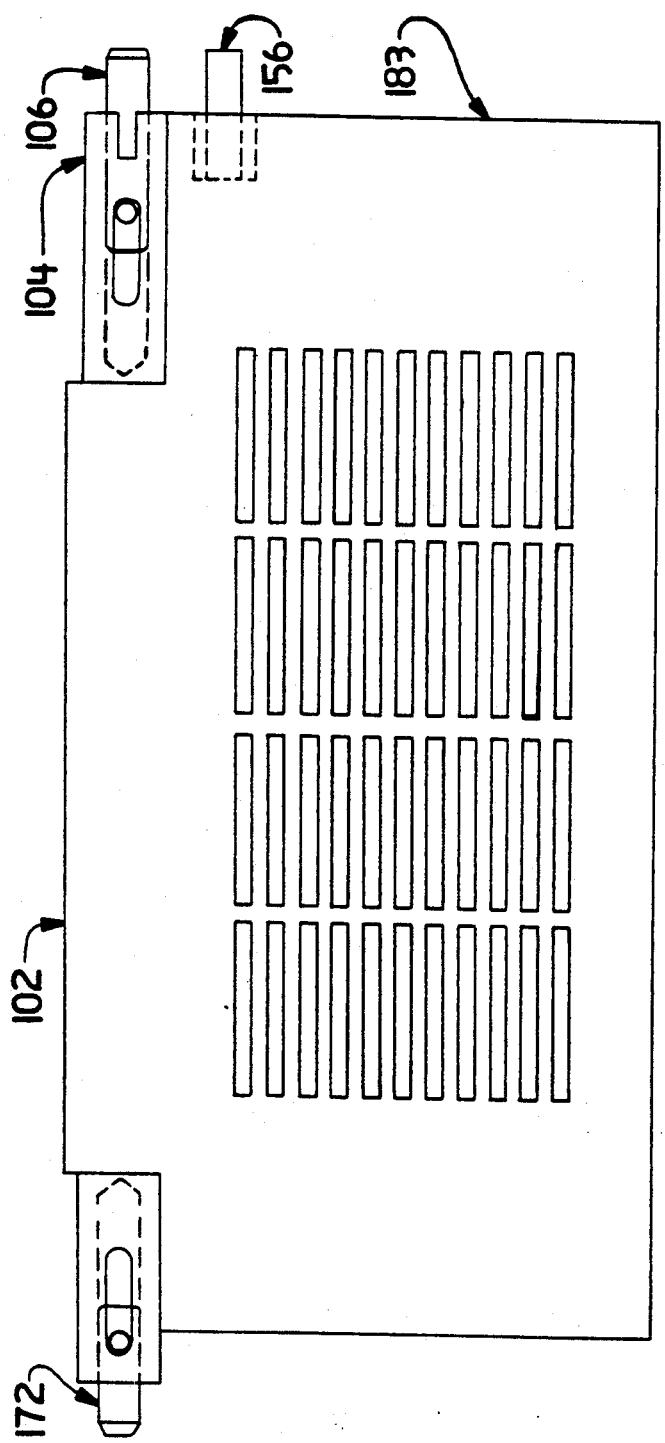

SAFETY INTERLOCK/LATCH ASSEMBLY FOR A PRINTING PRESS

BACKGROUND OF THE INVENTION

The present invention relates in general to a safety device for sheet-fed offset printing presses and in particular to a safety interlock/latch assembly for use with a guard element on the printing press.

Printing presses include numerous rotating cylinders/rollers which are well known in the prior art and may have various safety devices which are adapted to be used in connection with oppositely rotating cylinders/rollers. A pair of such oppositely rotating cylinders/rollers define between themselves a contact gap where the cylinders may, for example, directly engage each other or where they engage a sheet material which passes between and in engagement with such cylinders. These cylinders have parallel axes and, if present, the safety device will generally include a swingable switch actuating assembly turnable about an axis parallel to that of each cylinder/roller and co-acting with a control current limit switch in order to limit the operation of the machine when the safety device is moved away from the cylinders/rollers. Other safety devices have plates and barriers which protect an operator from various portions of a printing press when it is in operation. In general, such a device will be referred to as a "guard element".

It is also known that operators have purposely defeated various guard elements to make it easier to perform the many servicing functions required for operation of the printing press, such as, removal of components for cleaning and/or major maintenance. However, disabling the guard elements has led to accidents for the operator of such printing presses. In the prior art, if interlocked when the guard element is in a closed or protective position a limit switch is engaged and correspondingly when the guard element is moved out of the protective position the limit switch causes the printing press to stop. However, prior art safety devices including the limit switches have been easily by-passed by the operators.

The present invention overcomes these drawbacks in the prior art and provides a safety device or safety interlock/latch assembly for use with a guard element on a printing press which protects the operator and allows for easy removal and replacement of the guard element, and increases the probability that the operator will be unable to bypass the safety latch assembly.

SUMMARY OF THE INVENTION

It is an object of the present invention to provide an improved safety device or safety interlock/latch assembly for use with a guard element on a printing press.

The safety interlock/latch assembly of the present invention has at least one interlock block which has a socket for engaging a keyslot roller. The keyslot roller has at least a center aperture and a cross channel on a first side thereof. The first side of the roller is located adjacent a bottom wall of the socket in the interlock block and the interlock block has a keyslot in the bottom wall of the socket. The keyslot is in alignment with the cross channel and center aperture of the keyslot roller when the keyslot roller is in a predetermined position in the socket. The keyslot roller has at least one cam for engaging at least one actuator of a means for switching. When the keyslot roller is in one predetermined position a cam on the keyslot roller engages the actuator causing the means for switching to be in a first switch state and when the keyslot roller is rotated to at least one other different predetermined position, the cam is disengaged from the actuator and causes the means for switching to be in a second switch state. The guard element has at least a first end with a first shaft, the first shaft engaging the center aperture of the keyslot roller through the keyslot in the interlock block. The first end of the first shaft has a hole for receiving a cross pin. The cross pin is in alignment with the keyslot only when the keyslot roller is in the predetermined position. The cross pin is located in the cross channel of the keyslot roller when the shaft engages the center aperture of the keyslot roller.

The guard element has a second end with a second shaft for engaging an aperture in a frame, a support block, or other component of the printing press. The second end is opposed from the first end, such that the guard element is rotatable on the first and second shafts.

It is a feature of the present invention that when the guard element is in a position whereby the operator can access the printing press or when the guard element has been entirely removed from the printing press, the safety latch assembly, being enclosed, is protected from being manipulated by the operator. This is due to the keyslot roller, whose cam engages the actuator of the means for switching, is enclosed and therefore not readily accessible to the operator.

It is a further feature of the present invention that the guard element can be easily removed and reinstalled in the safety latch. It is also a feature that the guard element can be positively latched open as well as held shut.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several figures in which like reference numerals identify like elements, and in which:

FIG. 3 is a partial view with the guard element disengaged from the safety latch;

FIGS. 4 and 5 are front and back views of the safety latch;

FIG. 6 is a perspective view of a portion of the guard element;

FIG. 8 is a complete view of the guard element; and

FIG. 9 is a side view of the FIG. 8 guard element.

DESCRIPTION OF THE PREFERRED EMBODIMENT

Figure 1:
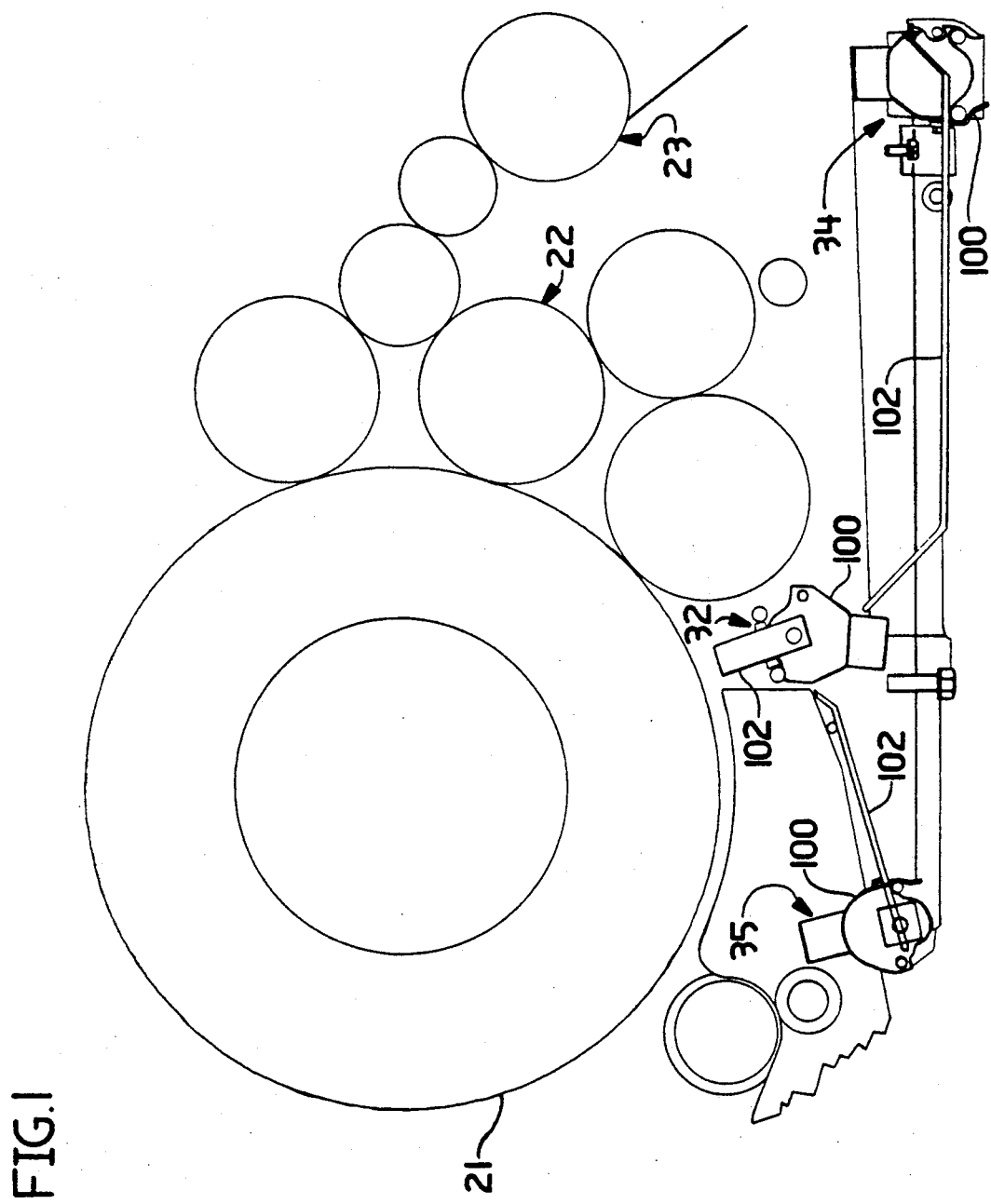
FIG. 1 is a partial view of a printing press showing the locations of safety interlock/latch assemblies.

The present invention has general applicability but is most particularly advantageously utilized in a printing press as partially depicted in FIG. 1. It should be noted and is evident to one skilled in the art that the safety latch for use with a guard element could be used on any type of machinery having moving parts wherein a guard is required. Thus there is essentially limitless applications of such a safety interlock/latch assembly. The description of the preferred embodiment however will be discussed in reference to printing presses.

As is well known in the prior art a printing press can have one or more units, each of which can include two printing couples having a blanket cylinder, a plate cylinder and possibly a common impression cylinder. Paper passes between the blanket cylinders and common impression cylinders in each unit for printing. As shown in FIG. 1, ink is applied to each plate cylinder 21 by a series of ink transfer rollers 22 which receive ink from an ink pickup roller 23. As is well known in the art, the ink transfer rollers 22 insure that the ink is distributed uniformly along their length and is applied uniformly to the rotating plate cylinder 21. Similarly, each plate cylinder 21 is supplied with a dampening water solution. The locations of some of the safety interlock/latch assemblies, which protect operators from the rotating cylinders and rollers, are depicted in FIG. 1.

More specifically, as shown in FIG. 1, some examples of the safety interlock/latch assemblies are a trip to stop guard 32 and area guards 34 and 35. Also the safety interlock/latch assembly can be a nip guard (not shown). Each safety interlock/latch assembly has a safety latch 100 and a guard element 102. The guard element 102 has different configurations depending upon its application, whereas the safety latch and the portion of the guard element connecting with the safety latch is identical for all safety interlock/latch assemblies.

Figure 7:
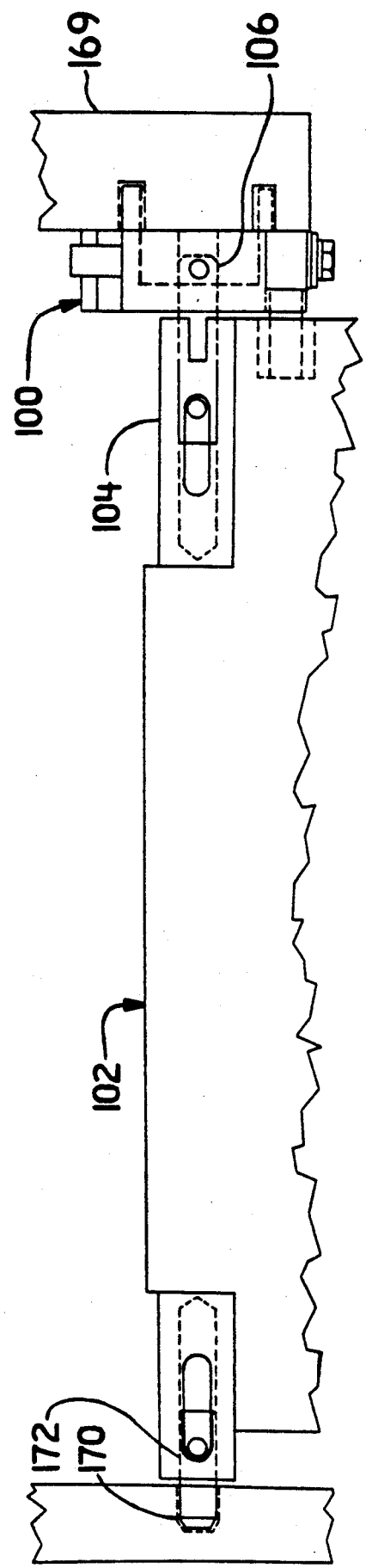
FIG. 7 is a partial view of the guard element engaged with the safety latch.

FIGS. 2A through 7 depict the safety latch 100 of the present invention for use with a guard element 102 on a printing press. The guard element 102 shown in FIGS. 3, 6, 7, 8 and 9 has at least a first end 104 with a first shaft 106. The first shaft 106 has a first end 108 for engaging a center aperture 110 of a keyslot roller 112 in the safety latch 100. The first end 108 of the first shaft 106 of the guard element 102 has a hole 114 for receiving a cross pin 116 (as can be more clearly seen in FIG. 6). The configuration of the shaft 106 with cross pin 116 is referred to as a lockable pivot means. As can be seen in FIG. 3 the first shaft 106 rides in a hole 118 in the guard element 102. A second end 120 of the first shaft 106 engages a spring 122 which is trapped between the second end 120 and a bottom wall 124 of the hole 118 in the guard element 102. A stop pin 126 rides in an opening 128 in the guard element 102 and keeps the first shaft 106 within the hole 118 of the guard element 102. The stop pin 126 extends outward from the guard element 102 a sufficient length such that an operator can push the stop pin to move the first shaft 106 totally within the guard element 102. A slot 130 is provided on the end 104 of the guard element 102 for receiving the cross pin 116 such that the first shaft 106 can be totally moved to a position within the guard element 102. FIG. 3 is a view showing the guard element 102 disengaged from the safety latch 100 and FIG. 7 is a view showing the guard element 102 engaged with the safety latch 100.

As in FIGS. 2A, 2B, 2C, 4 and 5 the safety latch 10 at least one interlock block 132 which has a socket for containing the keyslot roller 112. The keyslot 112 has a center aperture 110 and a cross channel 136 on a first side 138 thereof. The first side 138 of keyslot roller 112 is located adjacent a bottom wall 140 of the socket 134 in the interlock block 132 when keyslot roller 112 is assembled with the interlock block 132. The interlock block 132 has a keyslot configured opening 142 (hereinafter referred to simply as a keyslot) in the bottom wall 140 of he socket 134 as can be clearly seen in FIG. 4. The keyslot 142 is in alignment with the cross channel 136 and the center aperture of 110 of the keyslot roller 112 is in alignment with a center aperture 144 of the interlock block 100 when the roller 112 is in a predetermined position in the socket 134, hereinafter referred to as a second predetermined position.

Figure 2B:
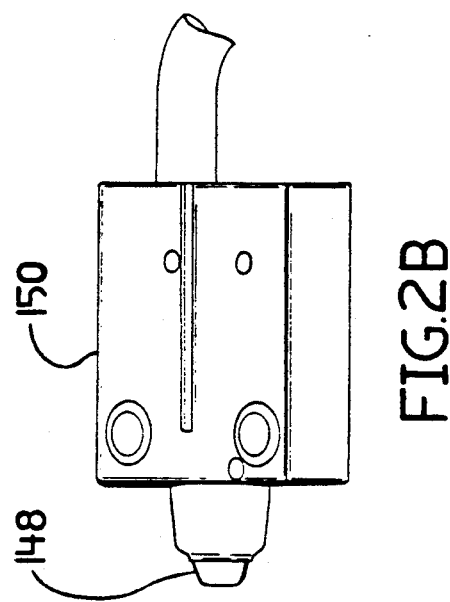
FIGS. 2A, 2B and 2C are perspective views of components of the safety latch used in the safety interlock/latch assembly.
Figure 2A:
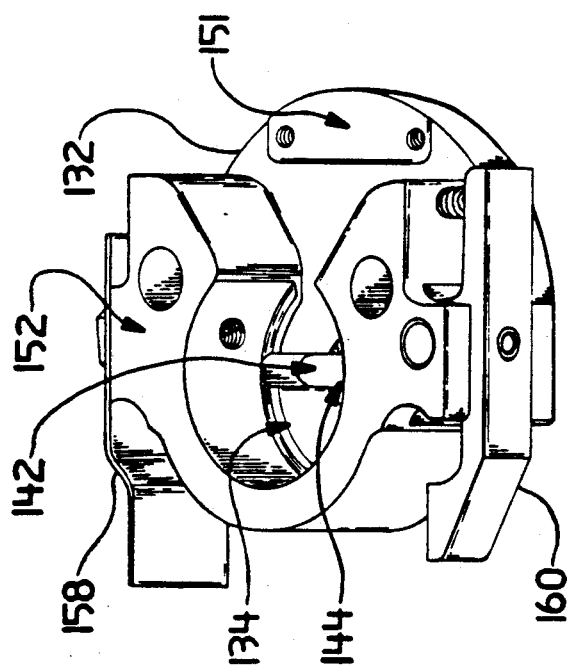
Figure 2C:
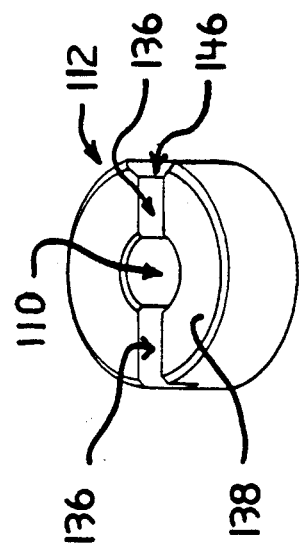
Figure 5:
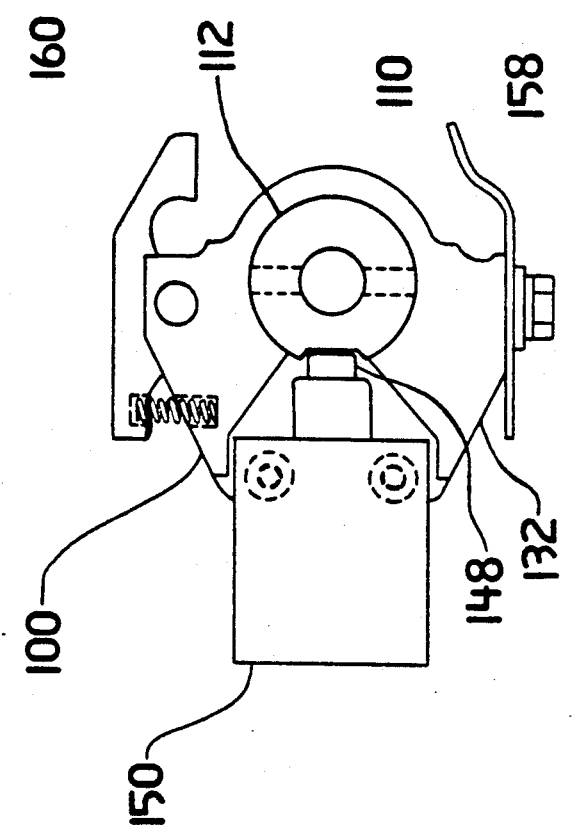

The 112 has at least one cam 146 see FIG. 2C) for engaging at least one actuator 148 of a switch 150. The switch 150 is attached to area 151 of the interlock block 132 as shown in FIGS. 2A, 2B and 2C. When the keyslot roller 112 is in a first predetermined position the cam 146 engages the actuator 148 of the switch 150 causing the switch 150 to be in a first switch state (see FIG. 5). When the keyslot roller 112 is rotated from the first predetermined position, the cam 146 is disengaged from the actuator 148 causing the switch 150 to be in a switch state. The switch 150 thereby sends electrical signals to electronic control devices in the printing press to indicate when the guard element 102 is in the first predetermined position. A third predetermined position can be any of all positions which are not the first predetermined position or the second predetermined position. Only the first predetermined position is the position when the guard element is in a protective position for operating the printing press. In the second predetermined position the guard element 102 can be completely removed. In the first predetermined position, as well as the third predetermined position, the cross pin 116 will be engaged with the cross channel 136 of keyslot roller 112. However, it will be in a position where the cross pin 116 is not able to engage the keyslot 142 of the interlock block 132. In this situation the guard element cannot be removed from the printing press since the first shaft 106 of the guard element cannot be retracted into the hole 118 of the guard element 102, being prevented by the bottom wall 140 of the socket 134 of the interlock block 132.

In both the second and third predetermined positions the movement of the printing press cylinders and rollers is limited in order to protect the operator. Only in the first predetermined position is the guard element 102 in the proper position for safe operation of the printing press.

When the guard element is rotated about the first shaft 106 of the guard element to the second predetermined a position, the keyslot roller 112 rotates to a position where the cross channel 136 of the keyslot 112 is in alignment with the keyslot 142 of the interlock block 132. In this position however the cam 146 of the keyslot roller 112 is disengaged from the actuator 148 of the switch 150 thereby causing the switch 150 to send a signal which stops the printing press or limits any movement. Therefore, operators are protected from running parts of the press. It is to be understood that the interlock block 132 is bolted to a frame 169 of the printing press or a mounting bracket such that its first side 152 is sealed. Therefore, it can be appreciated that the operator does not have ready access to the keyslot roller 112 nor to the switch 150. This inhibits the operator from bypassing or defeating the switch 150. When the guard element 102 is removed from the safety latch 100 the switch 150 will be in a position which indicates to the printing press that it has certain limitations of movement.

Typically the guard element 102 extends across the printing press and the opposed side of the printing press can either have a simple hole 170 for a second shaft 172 of the guard element 102 to ride in or can have a corresponding safety latch 100 on the opposed side. The second shaft 172 can be structured to be retracted from the hole 170 in a similar manner to the first shaft 106. Depending upon the application for which the guard element is used there can thus be one or two safety latches used with one guard element. The guard element itself can have various configurations, as well as, devices for open and closed engagement such as pin 156 for engaging spring latch 158 on the interlock block 132 (guard closed position) and release latch 160 on the interlock block 132 (guard open position). In the preferred embodiment the release latch 160 is pivotable at point 180 and is kept in a first position by spring 182 which contracts a first end 184. A second end 186 has a hook-shaped area 188 for receiving the pin 156 of the guard element 102. Manually depressing the first end 184 will release the pin 156 from the hook-shaped area 188 on the second end 186.

FIGS. 8 and 9 depict one example of a complete guard element 102. It is to be understood that the flat panel 183 is configured and shaped to fit the area which is to be guarded and can have various other configurations.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A safety interlock/latch assembly for use on a printing press comprising:
   at least one means for switching having an actuator;
   at least one interlock block having a socket for engaging a keyslot roller, said keyslot roller having at least first and second predetermined positions, said keyslot roller having at least a center aperture and a cross-channel on a first side thereof, said first side of said roller located adjacent a bottom wall of said socket in said interlock block, said interlock block having a keyslot in said bottom wall of said socket, said keyslot being in alignment with said cross-channel and center aperture of said keyslot roller when said keyslot roller is in said second predetermined position in said socket;
   said keyslot roller having at least one cam for engaging said actuator of said means for switching, and when said keyslot roller is in said first predetermined position said cam engages said actuator causing said means for switching to be in a first switch state thereby allowing normal operation of the printing press, and when said keyslot roller is rotated to at least said second predetermined position, different from said first predetermined position, said cam is disengaged from said actuator causing said means for switching to be in a second switch state; and
   at least one guard element in said printing press having at least a first end with a first shaft having a first end for engaging said center aperture of said keyslot roller through said keyslot in said interlock block, said first end of said first shaft having a hole for receiving a cross pin, said cross pin being in alignment with said keyslot and being in alignment with said cross-channel only when said keyslot roller is in said second predetermined position, said cross pin being received in said cross-channel of said keyslot roller when said shaft engages said center aperture of said keyslot roller;
   wherein, when said guard element is removable from or insertable into said interlock block because said keyslot roller is in said second predetermined position and said means for switching is in said second switch state operation of the printing press is limited.

2. The safety interlock/latch assembly according to claim 1, wherein said keyslot roller has a third predetermined position which is any one of all positions other than said first and second predetermined positions, and wherein, when said keyslot roller is in said third predetermined position, said cross-channel in said keyslot roller is not in alignment with said keyslot in said interlock block thereby preventing removal of said guard element from said interlock block and keyslot roller, and said means for switching is in said second switch state which allows only limited operation of the printing press.

3. The safety interlock/latch assembly according to claim 1, wherein said guard element has a second end having a second shaft which engages an aperture in a first section of a frame or mounting bracket on the printing press, said second end being opposed from said first end such that said guard element is rotatable on said first and second shafts, said interlock block being attached to a second section of said frame.

4. The safety interlock/latch assembly according to claim 1 wherein said guard element as a second end having a second shaft with a substantially identical configuration to said first shaft of said guard element which engages a second interlock block with a corresponding second keyslot roller, said second interlock block and said second keyslot roller having substantially a corresponding configuration to said interlock block and said keyslot roller.

5. The safety interlock/latch assembly according to claim 1, wherein said guard element is easily removable from and reinstallable with said interlock block and said keyslot roller.

6. The safety interlock/latch assembly according to claim 1, wherein said safety interlock/latch assembly further comprises: a release latch on a first side of said interlock block and a spring latch on an opposed second side of said interlock block; an engagement pin on said guard element engaging said spring latch to hold said guard element in a closed position and engaging said release latch for holding said guard element in an open position; and said release latch being pivotably connected to said first side of said interlock block at a pivot location, said release latch having a first end with a means for providing a spring force between said first end and said first side of said interlock block, and also having a second end with a hook-shaped area for receiving and temporarily holding said engagement pin of said guard element.

7. A safety interlock/latch assembly for use on a printing press, comprising:
   at least one guard element in said printing press;
   at least one lockable pivot means for causing rotation of said guard element, said lockable pivot means attached to a first end of said guard element;

keyslot roller means for engaging said lockable pivot means, said keyslot roller means having a means for switch actuation;

support means for rotatably holding said keyslot roller means, said support means having an aperture with a predetermined configuration for receiving said lockable pivot means, said support means located at least between said guard element and said keyslot roller means and attached to said printing press.

8. The safety interlock/latch assembly according to claim 7, wherein said lockable pivot means for causing rotation of said guard element has at least on said first end of said guard element a first shaft having a first end, said first end of said first shaft having a hole for receiving a cross pin.

9. The safety interlock/latch assembly according to claim 8, wherein said keyslot roller means for engaging said lockable pivot means has a center aperture for engaging said first shaft of said guard element and a cross channel on a first side of said keyslot roller means for engaging said cross pin, said keyslot roller means having at least one cam, said cam being said means for switch actuation which engages an actuator of at least one mean for switching.

10. The safety interlock/latch assembly according to claim 9, wherein said support means is an interlock block having a socket for engaging said keyslot roller means, said first side of said keyslot roller means being adjacent a bottom wall of said socket in said interlock block, said interlock block having a keyslot in said bottom wall of said socket, said keyslot being in alignment with said cross channel and center aperture of said keyslot roller means when said keyslot roller is in a predetermined position in said socket.

11. The safety interlock/latch assembly according to claim 10, wherein said safety interlock/latch assembly further comprises: a release latch on a first side of said interlock block and a spring latch on an opposed second side of said interlock block; an engagement pin on said guard element engaging said spring latch to hold said guard element in a closed position and engaging said release latch for holding said guard element in an open position; and said release latch being pivotably connected to said first side of said interlock block at a pivot location, said release latch having a first end with a means for providing a spring force between said first end and said first side of said interlock block, and also having a second end with a hook-shaped area for receiving and temporarily holding said engagement pin of said guard element.

12. The safety interlock/latch assembly according to claim 7, wherein said safety latch assembly has two lockable pivot means on opposed first and second ends of said guard element, and wherein said safety interlock/latch assembly also has first and second support means for rotatably holding first and second keyslot roller means, respectively, for engaging said lockable pivot means on said first and second ends, respectively, of said guard element.

13. The safety interlock/latch assembly according to claim 7, wherein said guard element has a second end having a shaft for engaging an aperture in a frame or mounting bracket on the printing press.

14. A safety interlock/latch assembly comprising:
at least one means for switching having an actuator;
at least one guard element;
at least one lockable pivot means for causing rotation of said guard element, said lockable pivot means attached to a first end of said guard element;

keyslot roller means for engaging said lockable pivot means, said keyslot roller means having at least one cam for switch actuation;

support means for rotatably holding said keyslot roller means, said support means having an aperture with a predetermined configuration for receiving said lockable pivot means said support means located at least between said guard element and said keyslot roller means;

said lockable pivot means for causing rotation of said guard element having at least on said first end of said guard element a shaft having a first end, said first end of said shaft having a hole for receiving a cross pin;

said keyslot roller means for engaging said lockable pivot means having a center aperture for engaging said first shaft of said guard element and a cross channel on a first side of said keyslot roller means for engaging said cross pin, said cam of said keyslot roller means contacting an actuator of at least one means for switching when said keyslot roller means is in a first predetermined position.

15. The safety interlock/latch assembly according to claim 14, wherein said keyslot roller has a second predetermined position in which said lockable pivot means is removable from and/or insertable with said support means and keyslot roller, said CAM being not in contact with said actuator of said means for switching.

16. The safety interlock/latch assembly according to claim 15, wherein said keyslot roller has a third predetermined position which is any one of all positions other than said first and second predetermined positions, in said third predetermined position said lockable pivot means being not removable from said interlock block and said keyslot roller, said cam being not in contact with said actuator of said means for switching.

17. The safety interlock/latch assembly according to claim 14, wherein said support means is an interlock block having a socket for engaging said keyslot roller means, said first side of said keyslot roller means being adjacent a bottom wall of said socket in said interlock block, said aperture in said interlock block being a keyslot in said bottom wall of said socket, said keyslot being in alignment with said cross channel and center aperture of said keyslot roller means when said roller is in a second predetermined position in said socket, thereby allowing easy insertion or removal of said guard element.

18. The safety interlock/latch assembly according to claim 17, wherein said safety interlock/latch assembly further comprises: a release latch on a first side of said interlock block and a spring latch on an opposed second side of said interlock block; an engagement pin on said guard element engaging said spring latch to hold said guard element in a closed position and engaging said release latch for holding said guard element in an open position; and said release latch being pivotably connected to said first side of said interlock block at a pivot location, said release latch having a first end with a means for providing a spring force between said first end and said first side of said interlock block, and also having a second end with a hook-shaped area for receiving and temporarily holding said engagement pin of said guard element.

19. The safety interlock/latch assembly according to claim 14, wherein said safety latch assembly has two lockable pivot means on opposed first and second ends of said guard element, and wherein said safety latch assembly also has first and second support means for rotatably holding first and second keyslot roller means, respectively, for engaging said lockable pivot means on said first and second ends, respectively, of said guard element.

20. The safety interlock/latch assembly according to claim 14, wherein said guard element has a second end having a shaft for engaging an aperture in a first section of a frame or mounting bracket on the printing press and the support means being attached to an opposed second section of said frame.

* * * * *